US012724471B2

(12) United States Patent
Su

(10) Patent No.: US 12,724,471 B2
(45) Date of Patent: Sep. 1, 2026

(54) CONVERTOR CIRCUIT AND FAILURE REPORTING METHOD

(71) Applicant: PowerX Semiconductor Corporation, Hsinchu County (TW)

(72) Inventor: Chih-Chieh Su, Hsinchu County (TW)

(73) Assignee: PowerX Semiconductor Corporation, Hsinchu County (TW)

( * ) Notice: Subject to any disclaimer, the term of this patent is extended or adjusted under 35 U.S.C. 154(b) by 138 days.

(21) Appl. No.: 18/601,988

(22) Filed: Mar. 11, 2024

(65) Prior Publication Data

US 2025/0208683 A1 Jun. 26, 2025

(30) Foreign Application Priority Data

Dec. 26, 2023 (TW) ................................ 112150862

(51) Int. Cl.
*G06F 1/30* (2006.01)
*G06F 1/28* (2006.01)
*H02M 3/158* (2006.01)

(52) U.S. Cl.
CPC .................. *G06F 1/30* (2013.01); *G06F 1/28* (2013.01); *H02M 3/1586* (2021.05)

(58) Field of Classification Search
CPC ........... G06F 1/30; G06F 1/28; H02M 3/1586
See application file for complete search history.

(56) References Cited

U.S. PATENT DOCUMENTS 9,543,838 B2 * 1/2017 Babazadeh ............ G01R 31/40
9,831,672 B2 * 11/2017 Luh .......................... G06F 1/26
10,069,421 B2 * 9/2018 Todorov .............. H02M 3/1584
11,940,864 B2 * 3/2024 Zou .......................... G06F 1/26
2011/0260765 A1 * 10/2011 Chen ...................... H03K 7/08 327/202
2019/0190279 A1 6/2019 Xu
2020/0295658 A1 * 9/2020 Schmitz .............. H02M 3/1584
2020/0412233 A1 * 12/2020 Shen .................. H02M 3/1586
2021/0376732 A1 * 12/2021 Zhang .................... H02M 3/01
2022/0038008 A1 * 2/2022 Wu ....................... H02M 1/088
2022/0337069 A1 10/2022 Sporck et al.
2023/0022716 A1 * 1/2023 Jones .................. A61N 5/1081

(Continued)

FOREIGN PATENT DOCUMENTS

CN 115808640 B 5/2023
TW 534375 U 5/2003

(Continued)

*Primary Examiner* — Aurel Prifti
(74) *Attorney, Agent, or Firm* — CKC & Partners Co., LLC

(57) ABSTRACT

The present disclosure provides convertor circuit and related failure reporting method. The convertor circuit includes multiple power stage circuits and a control circuit, and the control circuit is coupled with multiple temperature feedback terminals of the power stage circuits at a node, and is configured to receive a highest temperature signal through the node. The failure reporting method includes: in response to at least one failure event of at least one of the power stage circuits, controlling, by the at least one of the power stage circuits, the highest temperature signal to be in a preset voltage level; and outputting, by the at least one of the power stage circuits, at least one failure code signal to the control circuit through at least corresponding one of multiple current feedback terminals of the power stage circuits.

17 Claims, 5 Drawing Sheets

(56) References Cited

U.S. PATENT DOCUMENTS

| | | | | |
|---|---|---|---|---|
| 2023/0051490 | A1* | 2/2023 | Domingo | H02M 1/325 |
| 2023/0056704 | A1* | 2/2023 | Urai | H02M 1/325 |
| 2023/0070219 | A1* | 3/2023 | Aboueldahab | H02M 3/073 |
| 2023/0238875 | A1* | 7/2023 | Yang | H02M 3/1586 363/13 |
| 2024/0372473 | A1* | 11/2024 | Zafarana | H02M 1/327 |
| 2025/0132670 | A1* | 4/2025 | Sun | H02M 3/1586 |

FOREIGN PATENT DOCUMENTS

| | | |
|---|---|---|
| TW | M649022 U | 12/2023 |
| TW | M653765 U | 4/2024 |

* cited by examiner

CONVERTOR CIRCUIT AND FAILURE REPORTING METHOD

CROSS-REFERENCE TO RELATED APPLICATION

This application claims priority to Taiwan Application Serial Number 112150862, filed on Dec. 26, 2023, which is herein incorporated by reference in its entirety.

BACKGROUND

Field of Invention

This disclosure relates to a circuit and method, in particular to a convertor circuit and failure reporting method.

Description of Related Art

In related arts of multi-phase power convertor, there is a possibility to have occurrence of failure event on at least one phase circuit in the multi-phase power convertor due to some non-ideal factors. When the failure event occurs, the existing multi-phase power convertor usually can only let the user know that there is an occurrence of failure event, but is unable to pinpoint the phase circuits where the failure event occurs and the types thereof. Therefore, the user needs to spend a lot of time debugging the existing multi-phase power convertor, which is quite inconvenient for the user.

SUMMARY

An aspect of present disclosure relates to a convertor circuit. The convertor circuit includes a plurality of power stage circuits and a control circuit. The plurality of power stage circuits include a plurality of current feedback terminals and a plurality of temperature feedback terminals. The control circuit is coupled to the plurality of current feedback terminals, is coupled with the plurality of temperature feedback terminals at a node, and is configured to receive a highest temperature signal through the node, to obtain a highest temperature value of the plurality of power stage circuits according to the highest temperature signal. Wherein in response to at least one failure event of at least one of the plurality of power stage circuits, the at least one of the plurality of power stage circuits controls the highest temperature signal to be in a preset voltage level, and outputs at least one failure code signal to the control circuit through at least corresponding one of the plurality of current feedback terminals.

Another aspect of present disclosure relates to a failure reporting method applicable to a convertor circuit, wherein the convertor circuit includes a plurality of power stage circuits and a control circuit, and the control circuit is coupled with a plurality of temperature feedback terminals of the plurality of power stage circuits at a node, and is configured to receive a highest temperature signal through the node. The failure reporting method includes: in response to at least one failure event of at least one of the plurality of power stage circuits, controlling, by the at least one of the plurality of power stage circuits, the highest temperature signal to be in a preset voltage level; and outputting, by the at least one of the plurality of power stage circuits, at least one failure code signal to the control circuit through at least corresponding one of a plurality of current feedback terminals of the plurality of power stage circuits.

In summary, by utilizing the power stage circuits that detect the failure event to output the failure code signal to the control circuit through the current feedback terminal thereof, the convertor circuit of the present disclosure can precisely record which of the power stage circuits has detected the failure event and the type of the failure event. In this way, the time the user spends on debugging the convertor circuit can be significantly reduced.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
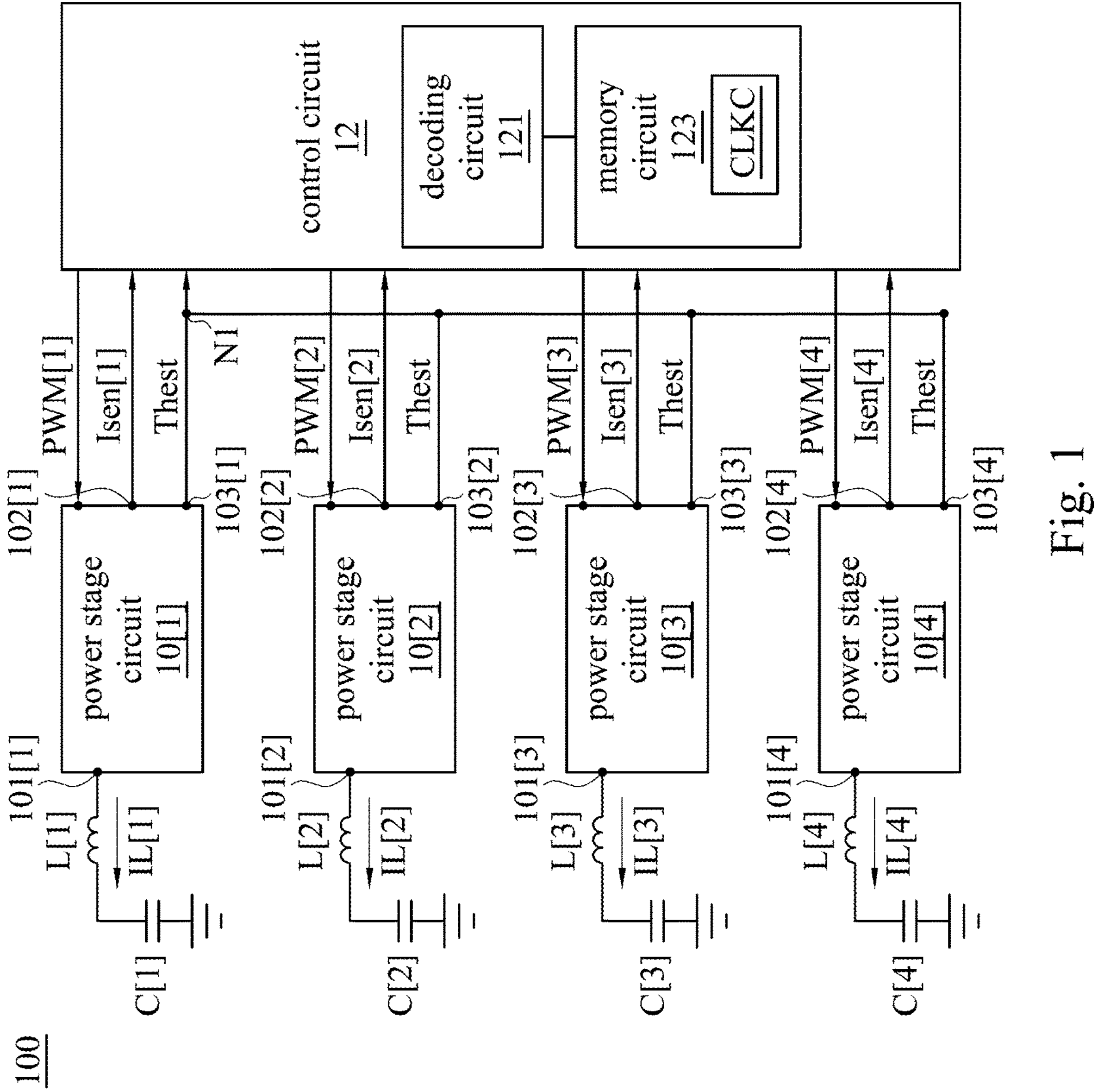
FIG. 1 is a schematic diagram of a convertor circuit in accordance with some embodiments of the present disclosure.

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

As used herein, “coupled” and “connected” may be used to indicate that two or more elements physical or electrical contact with each other directly or indirectly, and may also be used to indicate that two or more elements cooperate or interact with each other.

For clarity and convenience of descriptions, in part of the appended drawings, numerical indexes [1]-[4] are used to refer to individual components or signals, respectively, but it is not intended to limit the amount of the components or signals to a specific number. In addition, if a reference character of a component or signal is used without specifying a numerical index, it represents that reference character can be referred to any member within a component group or signal group to which it belongs. For example, the power stage circuit 10 is referred to any of the power stage circuits 10[1]-10[4].

Referring to FIG. 1, FIG. 1 is a schematic diagram of a convertor circuit 100 in accordance with some embodiments of the present disclosure. In some embodiments, as shown in FIG. 1, the convertor circuit 100 includes a plurality of power stage circuits 10[1]-10[4] and a control circuit 12.

Specifically, the convertor circuit 100 can be implemented with a DC/DC convertor such as, a multi-phase buck convertor. However, the present disclosure is not limited herein.

In some embodiments, a plurality of current output terminals 101[1]-101[4] of the power stage circuits 10[1]-10[4] are electrically coupled to a plurality of load circuits, respectively. Each of the load circuits may include an inductor L and a capacitor C electrically connected between the current output terminal 101 of the power stage circuit 10 and a ground terminal. For example, as shown in FIG. 1, the inductor L[1] and the capacitor C[1] are connected between the current output terminal 101[1] of the power stage circuit 10[1] and the ground terminal. The inductor L[2] and the capacitor C[2] are connected between the current output terminal 101[2] of the power stage circuit 10[2] and the ground terminal. The inductor L[3] and the capacitor C[3] are connected between the current output terminal 101[3] of the power stage circuit 10[3] and the ground terminal. Also, the inductor L[4] and the capacitor C[4] are connected between the current output terminal 101[4] of the power stage circuit 10[4] and the ground terminal.

In some embodiments, the control circuit 12 is electrically coupled to the power stage circuits 10[1]-10[4]. For example, as shown in FIG. 1, the control circuit 12 is coupled to the current output terminals 101[1]-101[4] of the power stage circuits 10[1]-10[4]. Also, the control circuit 12 is coupled with a plurality of temperature feedback terminals 103[1]-103[4] of the power stage circuits 10[1]-10[4] at a node N1. As can be seen from these embodiments, the temperature feedback terminals 103[1]-103[4] of the power stage circuits 10[1]-10[4] are coupled to one another, and are coupled to the control circuit 12.

In some embodiments, the convertor circuit 100 is configured to supply power. During the period that the convertor circuit 100 supplies the power, the control circuit 12 outputs a plurality of control signals PWM[1]-PWM[4] to the power stage circuits 10[1]-10[4], respectively. The power stage circuits 10[1]-10[4] output a plurality of output currents IL[1]-IL[4] according to the control signals PWM[1]-PWM[4], respectively. As shown in FIG. 1, the output current IL[1] of the power stage circuit 10[1] is outputted to the inductor L[1] and the capacitor C[1] through the current output terminal 101[1]. The output current IL[2] of the power stage circuit 10[2] is outputted to the inductor L[2] and the capacitor C[2] through the current output terminal 101[2]. The output current IL[3] of the power stage circuit 10[3] is outputted to the inductor L[3] and the capacitor C[3] through the current output terminal 101[3]. Also, the output current IL[4] of the power stage circuit 10[4] is outputted to the inductor L[4] and the capacitor C[4] through the current output terminal 101[4]. Specifically, in these embodiments, the control signal PWM can be implemented with a pulse width modulation (PWM) signal.

In some embodiments, the power stage circuits 10[1]-10[4] are configured to sense the output currents IL[1]-IL[4], respectively, to output a plurality of current feedback signals Isen[1]-Isen[4] to the control circuit 12 through the current feedback terminals 102[1]-102[4], respectively. The control circuit 12 can obtain a plurality of current sensing values corresponding to the output currents IL[1]-IL[4] according to the current feedback signals Isen[1]-Isen[4], so that the control circuit 12 can adjust the control signals PWM[1]-PWM[4] according to the current sensing values, making the power stage circuits 10[1]-10[4] achieve current balance (that is, the output currents IL[1]-IL[4] are substantially the same, or the difference therebetween is within a predetermined range).

In some embodiments, under the circuit structure where the control circuit 12 is coupled with the temperature feedback terminals 103[1]-103[4] of the power stage circuits 10[1]-10[4] at the node N1, a highest temperature signal Thest is present outside the power stage circuits 10[1]-10[4], and is transmitted to the power stage circuits 10[1]-10[4] and the control circuit 12 through the node N1. The highest temperature signal Thest is in a voltage level corresponding to the highest temperature value of the power stage circuits 10[1]-10[4]. Specifically, the highest temperature value is the temperature value of one of the power stage circuits 10[1]-10[4] with the highest temperature. The generation of the highest temperature signal Thest is described in detail below with reference to FIG. 2.

Figure 2:
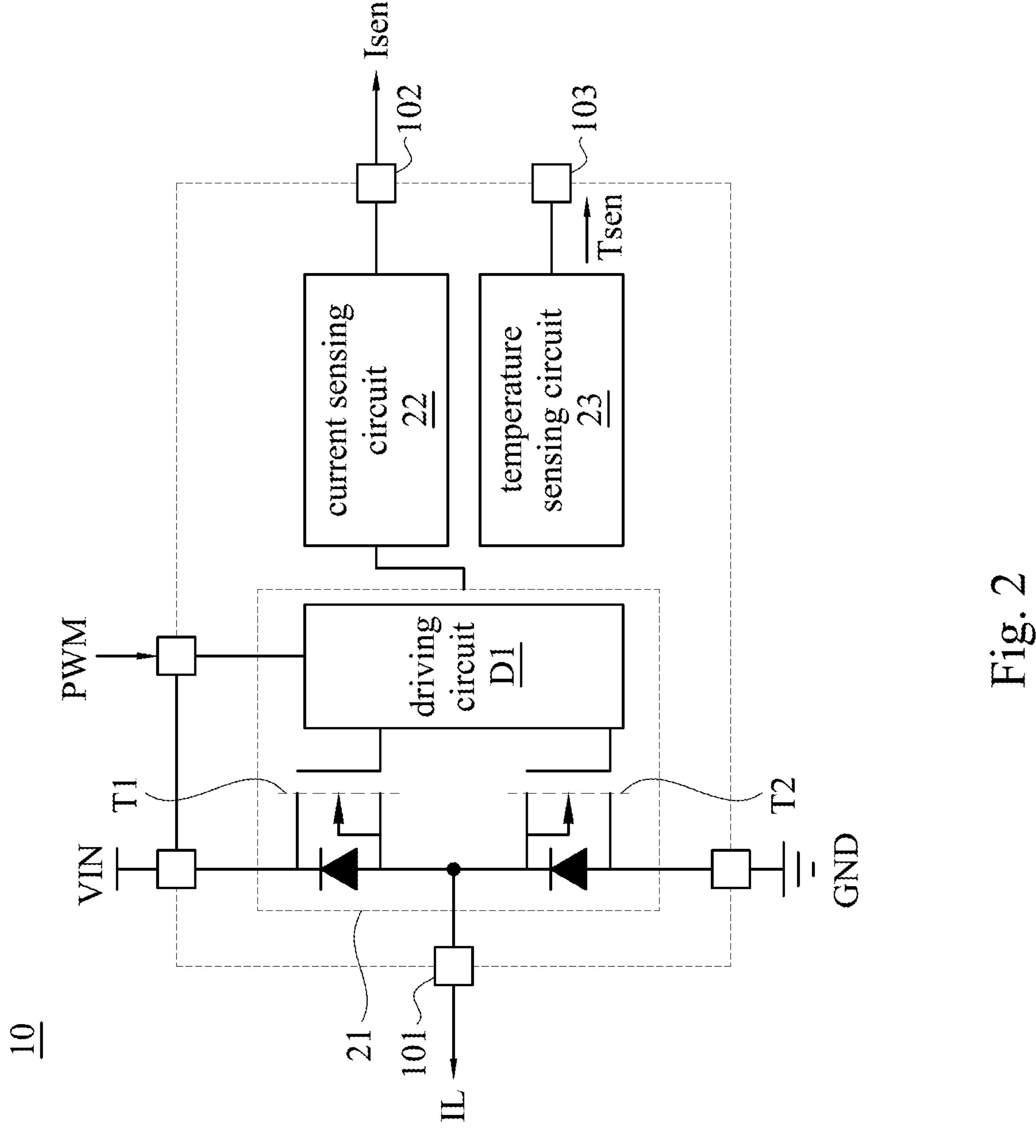
FIG. 2 is a schematic diagram of a power stage circuit in accordance with some embodiments of the present disclosure.

Referring to FIG. 2, FIG. 2 is a block diagram of the power stage circuit 10 in accordance with some embodiments of the present disclosure. In some embodiments, the power stage circuit 10 includes a power stage 21, a current sensing circuit 22 and a temperature sensing circuit 23. Specifically, the power circuit 21 is electrically coupled to the current output terminal 101 of the power stage circuit 10. The current sensing circuit 22 is electrically coupled to the power circuit 21 and the current feedback terminal 102. The temperature sensing circuit 23 is electrically coupled to the temperature feedback terminal 103.

In some embodiments, the power circuit 21 includes a hide-side switch T1, a low-side switch T2 and a driving circuit D1. The hide-side switch T1 is coupled between an input voltage VIN and the current output terminal 101, and the low-side switch T2 is coupled between the current output terminal 101 and a ground voltage GND. In other words, the hide-side switch T1 and the low-side switch T2 are connected between the input voltage VIN and the ground voltage GND. The driving circuit D1 is coupled to a control terminal of the hide-side switch T1, a control terminal of the low-side switch T2 and the control signal PWM, and is configured to drive the hide-side switch T1 and the low-side switch T2 to be alternatively turned on according to a duty ratio of the control signal PWM, so that the output current IL is outputted through the current output terminal 101. As the operation of the power circuit 21 is well known by the person skilled in the art of the present disclosure, the descriptions thereof are simplified herein. Specifically, each of the hide-side switch T1 and the low-side switch T2 can be implemented with a transistor (e.g., metal oxide semiconductor (MOS) transistor), and the driving circuit D1 can be implemented with a gate driver. That is, the driving circuit D1 can output driving signals to a gate (i.e., the control terminal) of the hide-side switch T1 and a gate (i.e., the control terminal) of the low-side switch T2. It should be understood that the present disclosure is not limited herein.

In some embodiments, the current sensing circuit 22 is configured to sense the output current IL, and is configured to generate the current feedback signal Isen according to the sensing result, to output the current feedback signal Isen through the current feedback terminal 102. For example, the current sensing circuit 22 can allow the output current IL to flow through a resistor, and can generate the current feedback signal Isen according to a voltage difference across both terminals of the resistor. In another example, the current sensing circuit 22 can utilize Hall Effect to convert a magnetic field surrounding the output current IL into a voltage, and can generate the current feedback signal Isen according to the conversion result. Specifically, the current feedback signal Isen is a voltage signal (but the present disclosure is not limited herein), and is in a voltage level corresponding to the magnitude of the output current IL.

In some embodiments, the temperature sensing circuit 23 is configured to sense the temperature of the power stage circuit 10, and is configured to generate a temperature feedback signal Tsen to the temperature feedback terminal 103. Specifically, the temperature feedback signal Tsen is in a voltage level corresponding to the temperature of the power stage circuit 10. In particular, the voltage level of the temperature feedback signal Tsen and the temperature of the power stage circuit 10 are positively correlated.

As can be seen from the descriptions of the temperature sensing circuit 23, the power stage circuits 10[1]-10[4] in FIG. 1 generates multiple temperature feedback signals Tsen, and the temperature feedback signals Tsen are outputted at the temperature feedback terminals 103[1]-103[4]. A voltage level of one of the temperature feedback signals Tsen corresponds to the temperature of its counterpart among the power stage circuits 10[1]-10[4]. In the circuit structure where the control circuit 12 is coupled with the temperature feedback terminals 103[1]-103[4] of the power stage circuits 10[1]-10[4] at the node N1, one of the temperature feedback signals Tsen with the highest voltage level (i.e., the temperature feedback signal Tsen generated by one of the power stage circuits 10[1]-10[4] with the highest temperature) determines a voltage level of the temperature feedback signal Tsen received ultimately by the control circuit 12, and is used as the highest temperature signal Thest. Also, the highest temperature signal Thest is transmitted to the control circuit 12 through the node N1, and therefore the control circuit 12 can obtain the temperature (i.e., the aforementioned highest temperature value) of one of the power stage circuits 10[1]-10[4] with the highest temperature according to the voltage level of the highest temperature signal Thest. It is noted that although the highest temperature signal Thest received ultimately by the control circuit 12 is related to the one of the power stage circuits 10[1]-10[4] with the highest temperature, the control circuit 12 is unable to be aware of which of the power stage circuits 10[1]-10[4] has the highest temperature, and can only be informed of the highest temperature value of the power stage circuits 10[1]-10[4] according to the voltage level of the highest temperature signal Thest.

In some embodiments, the power stage circuit 10 is configured to detect failure events occurred due to some non-ideal factors. Specifically, the failure event may be under-voltage failure, over-voltage failure, over-current failure, over-power failure, over-temperature failure, short-circuit failure or any combination of the above. The under-voltage failure, the over-voltage failure, the over-current failure, the over-power failure, the over-temperature failure and the short-circuit failure are well known by the person skilled in the art of the present disclosure, and therefore the descriptions thereof are omitted herein.

Figure 3:
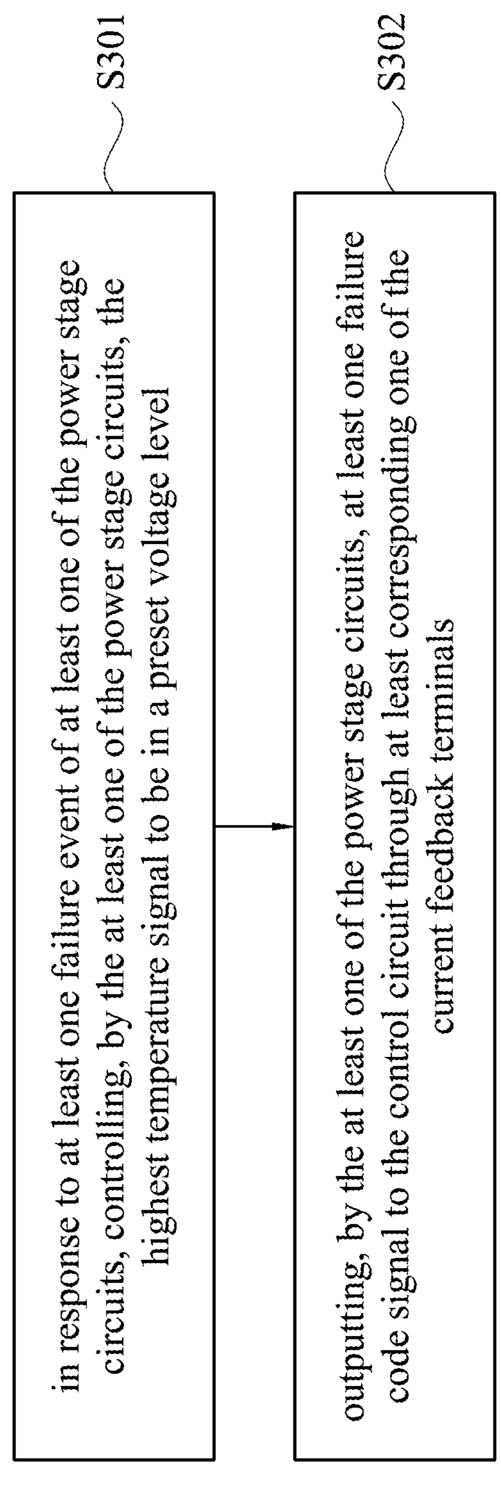
FIG. 3 is a flowchart of a failure reporting method in accordance with some embodiments of the present disclosure.

The operation of the convertor circuit 100 after the power stage circuit 10 detects the occurrence of the failure event is then described with reference to a failure reporting method 300 as shown in FIG. 3. Referring to FIG. 3, FIG. 3 is a flowchart of the failure reporting method 300 in accordance with some embodiments of the present disclosure. In some embodiments, as shown in FIG. 3, the failure reporting method 300 includes operations S301-S302. The operations S301-S302 are described in detail with reference to the convertor circuit 100 of FIG. 1 and FIGS. 4 and 5, in which FIGS. 4 and 5 are diagrams illustrating the adjustments of the current feedback signal Isen based on the highest temperature signal Thest in accordance with some embodiments of the present disclosure.

In some embodiments, at least one of the power stage circuits 10[1]-10[4] detects at least one failure event, and thus operation S301 is executed. In operation S301, at least one of the power stage circuits 10[1]-10[4] (more particularly, the power stage circuit 10 that has detected the failure event) controls the highest temperature signal Thest to be in a preset voltage level VH as shown in FIG. 4 or 5 in response to at least one failure event of at least one of the power stage circuits 10[1]-10[4]. In the embodiments of FIG. 4 or 5, the preset voltage level VH can be the highest voltage level (e.g., 3.3 volts) the system of the convertor circuit 100 could reach, and is used as a high logic level. In practice, the temperature feedback signal Tsen generated by one of the power stage circuits 10[1]-10[4] with the highest temperature does not reach the preset voltage level VH under normal operating conditions. Therefore, when the control circuit 12 receives the highest temperature signal Thest with the preset voltage level VH through the node N1, the control circuit 12 can be aware of that at least one of the power stage circuits 10[1]-10[4] has detected at least one failure event.

Figure 4:
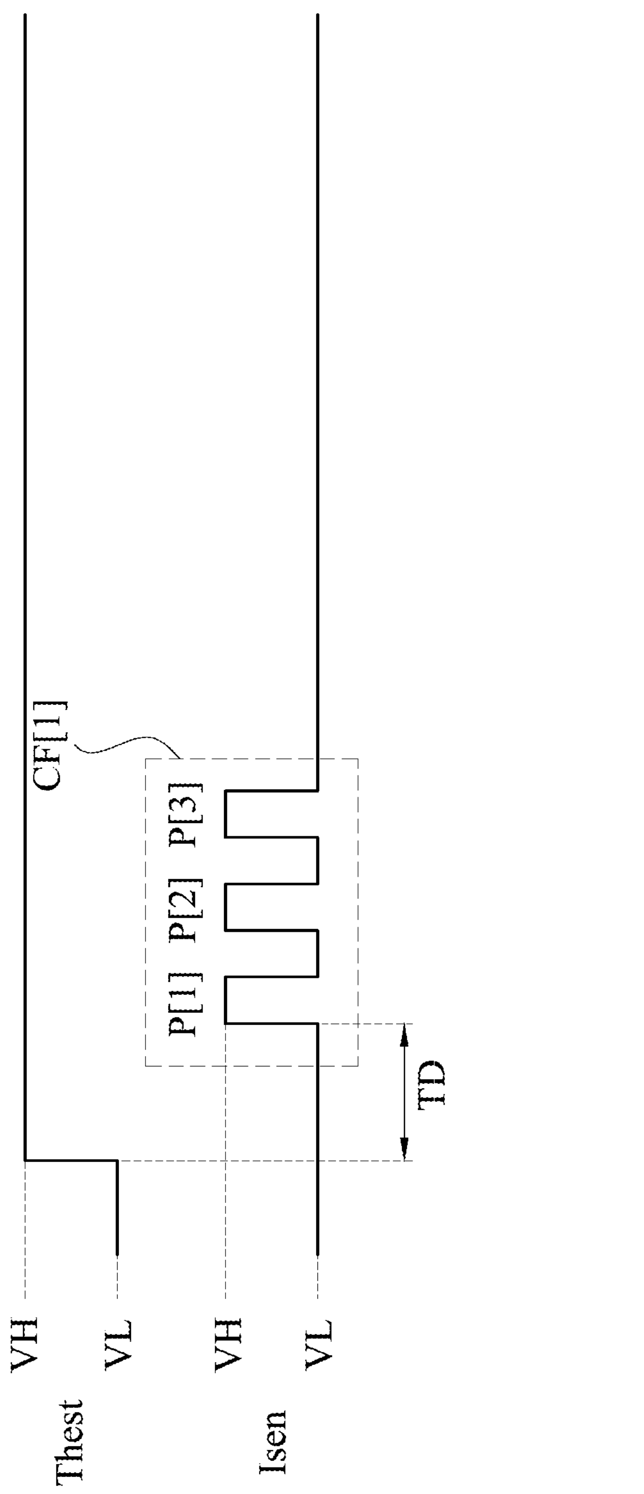
FIG. 4 is a diagram illustrating an adjustment of a highest temperature signal and a current feedback signal in accordance with some embodiments of the present disclosure.
Figure 5:
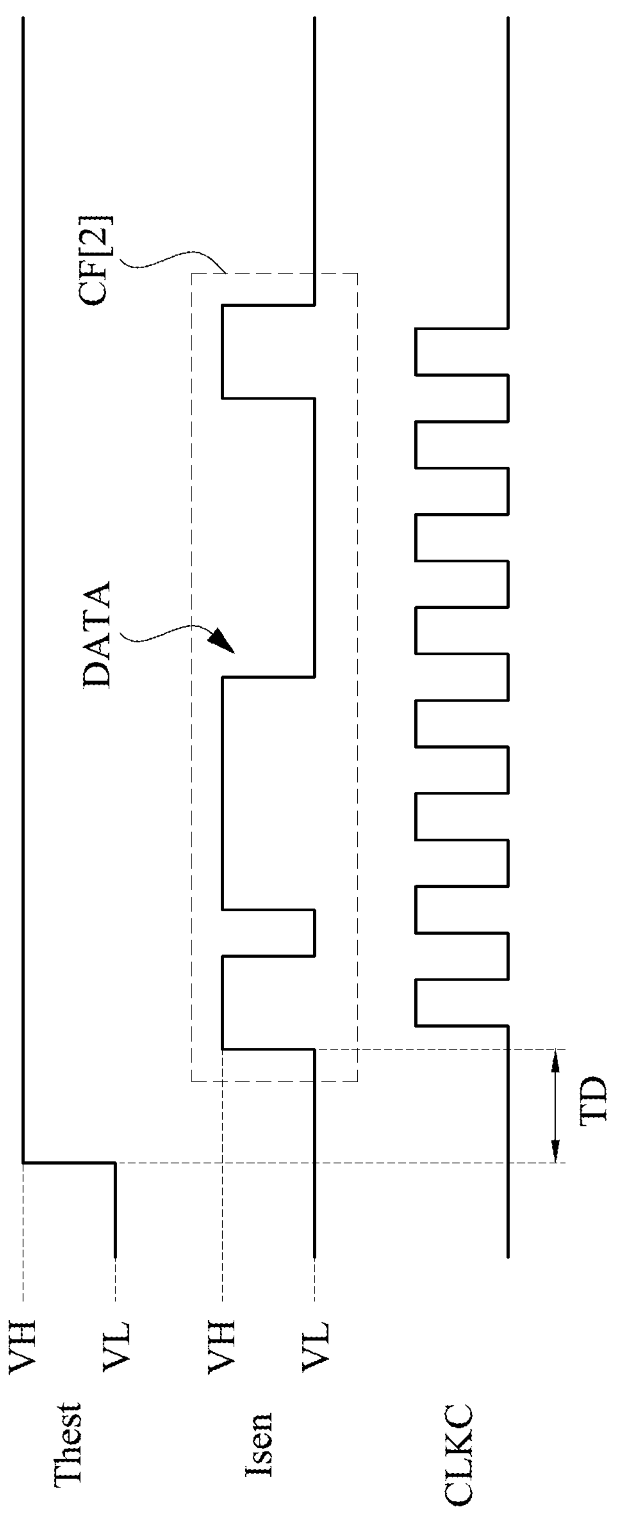
FIG. 5 is a diagram illustrating an adjustment of a highest temperature signal and a current feedback signal in accordance with some embodiments of the present disclosure.

In FIGS. 4 and 5, for convenience of descriptions, it is assumed that the voltage level of the highest temperature signal Thest is changed from another preset voltage level VL to the preset voltage level VH, in which the preset voltage level VL can be the lowest voltage level (e.g., 0 volt) that the system of the convertor circuit 100 is capable of reaching, and the preset voltage levels VH and VL are configured to present opposite logics on the signal. However, the present disclosure is not limited thereto. In some embodiments, before the voltage level of the highest temperature signal Thest is changed to the preset voltage level VH due to detecting at least one failure event, the voltage level of the highest temperature signal Thest changes with the temperature of one of the power stage circuits 10[1]-10[4] with the highest temperature rather than being maintained in the preset voltage level VL.

The operation S301 is further described by taking the power stage circuit 10[1] that has detected the failure event as an example. In the situation where the power stage circuit 10[1] detects the failure event, the power stage circuit 10[1] controls the internal temperature sensing circuit 23 (as shown in FIG. 2) to output the temperature feedback signal Tsen with the preset voltage level VH through the temperature feedback terminal 103[1]. In accordance with the aforementioned descriptions, the temperature feedback signal Tsen generated by one of the power stage circuits 10[1]-10[4] with the highest temperature generally does not reach the preset voltage level VH (that is, the voltage level of the current highest temperature signal Thest is generally lower than the preset voltage level VH) in the situation where the power stage circuit 10 is normally operated. Therefore, after the temperature feedback signal Tsen with the preset voltage level VH is outputted outside the power stage circuit 10[1], the current highest temperature signal Thest is replaced with the temperature feedback signal Tsen with the preset voltage level VH as the renewed highest temperature signal Thest. This renewed highest temperature signal Thest is in the preset voltage level VH.

In operation S302, at least one of the power stage circuits 10[1]-10[4] outputs at least one failure code signal CF to the control circuit 12 through at least corresponding one of the current feedback terminals 102[1]-102[4]. Given that the power stage circuit 10[1] detects the failure event, the power stage circuit 10[1] is configured to adjust the voltage level of the current feedback signal Isen[1] according to the failure event to generate the failure code signal CF, so as to output the failure code signal CF to the control circuit 12 through the current feedback terminal 102[1].

In some further embodiments, each of the aforementioned various failure events (i.e., the under-voltage failure, the over-voltage failure, the over-current failure, the over-power failure, the over-temperature failure, the short-circuit failure, etc.) is preset to be corresponding to a preset pulse count. For example, the under-voltage failure is corresponding to a one-pulse count. In another example, the over-voltage failure is corresponding to a two-pulse count. Accordingly, the power stage circuit 10 that has detected the failure event can control the current sensing circuit 22 according to the pulse count corresponding to the certain failure event (e.g., the over-current failure) to adjust the voltage level of the current feedback signal Isen, so as to generate a corresponding number of the pulse count. As shown in FIG. 4, according to the specific failure event, three pulses P[1]-P[3] are generated at the voltage level of the current feedback signal Isen as the failure code signal CF[1], that is, the pulse count is equal to 3. Different pulse counts can be used to represent different failure events, such as the under-voltage failure, the over-voltage failure, the over-current failure, the over-power failure, the over-temperature failure, the short-circuit failure, etc.

In some further embodiments, the aforementioned various failure events (i.e., the under-voltage failure, the over-voltage failure, the over-current failure, the over-power failure, the over-temperature failure, the short-circuit failure, etc.) each is preset to be corresponding to a data code DATA. Specifically, the data code DATA can be implemented with serial data as defined by the Inter-Integrated Circuit (I2C) protocol. Accordingly, as shown in FIG. 5, the power stage circuit 10 that detects the failure event can adjust the voltage level of the current feedback signal Isen according to the data code DATA corresponding to the failure event, so as to generate the failure code signal CF[2] with the data code DATA.

In some embodiments, after the control circuit 12 receives the failure code signal CF from the power stage circuit 10 that detects the failure event (i.e., after operation S302), the control circuit 12 can decode the failure code signal CF through an internal decoding circuit 121, to obtain and store a type of the failure event. Specifically, the control circuit 12 can store the type of the failure event, decoded data corresponding to the type of the failure event and time and location that the failure event occurs (that is, which of the power stage circuits 10[1]-10[4] fails) through an internal memory circuit 123 (as shown in FIG. 1).

In some further embodiments, the control circuit 12 can use a clock signal CLKC stored in the memory circuit 123 to decode the failure code signal CF, so as to obtain the preset pulse count or the data code DATA carried by the failure code signal CF. For example, the control circuit 12 is triggered by the pulse in each cycle of the clock signal CLKC to convert the voltage level of the failure code signal CF[2] in FIG. 5 into serial data, so as to obtain the data code DATA, in which the failure code signal CF[2] can be a 4-bit or 8-bit signal, but the present disclosure is not limited thereto.

In some embodiments, as shown in FIGS. 4 and 5, the power stage circuit 10 that detects the failure event performs and completes synchronization with the control circuit 12 during a period TD. In FIGS. 4 and 5, the period TD begins approximately at the time when the voltage level of the highest temperature signal Thest changes from the preset voltage level VL to the preset voltage level VH, and ends approximately at the time when the failure code signal CF is generated. As can be seen from these descriptions, after the power stage circuit 10 that detects the failure event completes the synchronization with the control circuit 12, the power stage circuit 10 that detects the failure event outputs the failure code signal CF to the control circuit 12 through the current feedback terminal 102 thereof, to ensure that the control circuit 12 decodes correctly.

In some further embodiments, when the highest temperature signal Thest is in the preset voltage level VH, each of the power stage circuit 10 that detects the failure event and the control circuit 12 delays an internal clock signal by a preset time, to complete the synchronization. That is to say, the power stage circuit 10 that detects the failure event delays an internal clock signal (not shown) by the preset time, and the control circuit 12 also delays the internal clock signal CLKC (as shown in FIG. 5) by the preset time. It should be understood that the aforementioned preset time may not be longer than the period TD.

Specifically, delaying the internal clock signal CLKC of the control circuit 12 (or the internal clock signal of the power stage circuit 10) can be regarded as delaying the generation of pulses of the clock signal CLKC following the current cycle. That is to say, the pulse that the internal clock signal of the power stage circuit 10 generates in each cycle and the pulse that the internal clock signal CLKC of the control circuit 12 generates in each cycle are synchronized on time after being delayed. In such a way, since the power stage circuit 10 that detects the failure event is substantially triggered by the pulse in each cycle of the internal clock signal to generate the failure code signal CF with the preset pulse count or the data code DATA, the control circuit 12 can accurately decode the failure code signal CF through the clock signal CLKC which is synchronized with the internal clock signal of the power stage circuit 10.

In sum, the current feedback signal Isen and the temperature feedback signal Tsen (or the highest temperature signal Thest) are not simply used to point out the occurrence of the failure event. The current feedback signal Isen is further used to carry the failure code signal CF to point out the type, occurrence time and location of the failure event. The temperature feedback signal Tsen is further used to fulfill the synchronization between the power stage circuit 10 and the control circuit 12.

In some embodiments, as shown in FIGS. 4 and 5, during the period TD that the power stage circuit 10 that detects the failure event performs the synchronization with the control circuit 12, the voltage level of the current feedback signal Isen of the power stage circuit 10 that detects the failure event is changed to the preset voltage level VL.

Similar to the descriptions of the highest temperature signal Thest in FIGS. 4 and 5, in FIGS. 4 and 5, for convenience of descriptions, the current feedback signal Isen is illustrated to be in the preset voltage level VL before the period TD. However, the present disclosure is not limited thereto. In some embodiments, before the period TD, the voltage level of the current feedback signal Isen can change with the output current IL of the power stage circuit 10 rather than maintaining in the preset voltage level VL.

In some further embodiments, when the highest temperature signal Thest is in the preset voltage level VH, the control circuit 12 controls the voltage level of the current feedback signal Isen to be changed to the preset voltage level VL during the period TD by disabling the control signal PWM. Specifically, disabling the control signal PWM can be regarded as maintaining the control signal PWM whose voltage level originally changes according to the duty ratio to be in the disable level. According to the control signal PWM with the disable level, the power circuit 21 of FIG. 2 does not output the output current IL of the power stage circuit 10 through the current output terminal 101 (or the output current IL of the power stage circuit 10 is changed to zero), and therefore the current feedback signal Isen of the power stage circuit 10 would be in the preset voltage level VL. In the embodiments of FIG. 1, during the period TD, the output currents IL[1]-IL[4] of the power stage circuits 10[1]-10[4] can be changed to zero simultaneously, so that the current feedback signals Isen[1]-Isen[4] can be in the preset voltage level VL simultaneously. After the period TD, only the power stage circuit 10 that detects the failure event outputs the failure code signal CF to the control circuit 12 through the current feedback terminal 102. In such a way, the control circuit 12 can be clearly aware of which of the power stage circuits 10[1]-10[4] has detected the failure event.

In the above embodiments, after the control circuit 12 stores the type, occurrence time and location of the failure event (i.e., which of the power stage circuits 10 has detected the failure event) through the internal memory circuit 123, the control circuit 12 can execute a shutdown operation, so that the convertor circuit 100 stops supplying the power. The shutdown operation is well known by the person skilled in the art of the present disclosure, and therefore the descriptions thereof are omitted here.

As can be seen from the above embodiments of the present disclosure, since the power stage circuit 10 that detects the failure event outputs the failure code signal to the control circuit 12 through the current feedback terminal 102, the convertor circuit 100 of the present disclosure can clearly record which of the power stage circuits 10 has detected the failure event and the type of the failure event. In other words, the user of the convertor circuit 100 can directly know which of the power stage circuits 10 has detected the failure event and the type of the failure event by accessing the internal memory circuit 123 of the control circuit 12 in the convertor circuit 100. In such a way, the time the user spends on debugging the convertor circuit can be significantly reduced.

The present invention can fulfill the failure identification on the power stage circuit 10 through the control circuit 12 for single-phase power supply solution or multi-phase power supply solution. Specifically, in some embodiments, in the multi-phase power supply solution as shown in FIG. 1, the current feedback signals Isen[1]-Isen[4] of the power stage circuits 10[1]-10[4] each is coupled to one current feedback terminal on the control circuit 12, and the temperature feedback signals Tsen of the multi-phase (or the highest temperature signal Thest) are coupled and to be transmitted to the control circuit 12 through the node N1. Therefore, with detecting the changes of the current feedback signals Isen[1]-Isen[4] and the temperature feedback signal Tsen, the present disclosure can fulfill the failure alert function of each phase of power.

As used herein, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A convertor circuit, comprising:

a plurality of power stage circuits, comprising a plurality of current feedback terminals and a plurality of temperature feedback terminals; and a control circuit, coupled to the plurality of current feedback terminals, coupled with the plurality of temperature feedback terminals at a node, and configured to receive a highest temperature signal through the node, to obtain a highest temperature value of the plurality of power stage circuits according to the highest temperature signal;

wherein in response to at least one failure event of at least one of the plurality of power stage circuits, the at least one of the plurality of power stage circuits controls the highest temperature signal to be in a preset voltage level, and outputs at least one failure code signal to the control circuit through at least corresponding one of the plurality of current feedback terminals, wherein the plurality of power stage circuits are configured to output a plurality of current feedback signals to the control circuit through the plurality of current feedback terminals, and at least corresponding one of the plurality of current feedback signals outputted by the at least corresponding one of the plurality of current feedback terminals comprises the at least one failure code signal, wherein after the at least one of the plurality of power stage circuits completes a synchronization with the control circuit, the at least one of the plurality of power stage circuits outputs the at least one failure code signal to the control circuit through the at least corresponding one of the plurality of current feedback terminals, wherein when the highest temperature signal is in the preset voltage level, the at least one of the plurality of power stage circuits and the control circuit simultaneously delay respective clock signals by a preset time, to complete the synchronization, and wherein during a period when the at least one of the plurality of power stage circuits performs the synchronization with the control circuit, a voltage level of the at least corresponding one of the plurality of current feedback signals is changed to another preset voltage level different from the preset voltage level.

2. The convertor circuit of claim 1, wherein when the highest temperature signal is in the preset voltage level, the at least one of the plurality of power stage circuits generates the at least one failure code signal by adjusting a voltage level of the at least corresponding one of the plurality of current feedback signals.

3. The convertor circuit of claim 2, wherein the at least one of the plurality of power stage circuits adjusts the at least corresponding one of the plurality of current feedback signals to having a corresponding pulse count as the at least one failure code signal according to the at least one failure event.

4. The convertor circuit of claim 2, wherein the at least one of the plurality of power stage circuits adjusts the at least corresponding one of the plurality of current feedback signals to having a corresponding data code as the at least one failure code signal according to the at least one failure event.

5. The convertor circuit of claim 1, wherein the plurality of power stage circuits each comprising:

a power circuit, coupled to the control circuit, and configured to output a corresponding one of a plurality of output currents according to a corresponding one of a plurality of control signals outputted by the control circuit;

a current sensing circuit, coupled to a corresponding one of the plurality of current feedback terminals, and configured to sense the corresponding one of a plurality of output currents, to output a corresponding one of the plurality of current feedback signals through the corresponding one of the plurality of current feedback terminals; and a temperature sensing circuit, coupled to a corresponding one of the plurality of temperature feedback terminals, and configured to sense a temperature of a corresponding one of the plurality of power stage circuits, to output a corresponding one of a plurality of temperature feedback signals, wherein one of the plurality of temperature feedback signals with a maximum voltage level is used as the highest temperature signal.

6. The convertor circuit of claim 1, wherein the control circuit is configured to output a plurality of control signals to the plurality of power stage circuits, respectively;

wherein when the highest temperature signal is in the preset voltage level, the control circuit controls the plurality of current feedback signals to be in another preset voltage level different from the preset voltage level by disenabling the plurality of control signals.

7. The convertor circuit of claim 1, wherein the control circuit is configured to decode the at least one failure code signal, to obtain and store a type of the at least one failure event.

8. A convertor circuit, comprising:

a plurality of power stage circuits, comprising a plurality of current feedback terminals and a plurality of temperature feedback terminals; and a control circuit, coupled to the plurality of current feedback terminals, coupled with the plurality of temperature feedback terminals at a node, and configured to receive a highest temperature signal through the node, to obtain a highest temperature value of the plurality of power stage circuits according to the highest temperature signal, wherein the plurality of power stage circuits are configured to output a plurality of current feedback signals to the control circuit through the plurality of current feedback terminals;

wherein in response to at least one failure event of at least one of the plurality of power stage circuits, the at least one of the plurality of power stage circuits controls the highest temperature signal to be in a preset voltage level, and outputs at least corresponding one of the plurality of current feedback signals, which comprises at least one failure code signal, to the control circuit through at least corresponding one of the plurality of current feedback terminals, and wherein the at least one failure code signal comprises a corresponding pulse count or data code capable of indicating the at least one failure event of the at least one of the plurality of power stage circuits;

wherein after the at least one of the plurality of power stage circuits completes a synchronization with the control circuit, the at least one of the plurality of power stage circuits outputs the at least one failure code signal to the control circuit through the at least corresponding one of the plurality of current feedback terminals;

wherein during a period when the at least one of the plurality of power stage circuits performs the synchronization with the control circuit, a voltage level of the at least corresponding one of the plurality of current feedback signals is changed to another preset voltage level different from the preset voltage level.

9. A failure reporting method, applicable to a convertor circuit, wherein the convertor circuit comprises a plurality of power stage circuits and a control circuit, the control circuit is coupled with a plurality of temperature feedback terminals of the plurality of power stage circuits at a node, and is configured to receive a highest temperature signal through the node, and the failure reporting method comprises:

in response to at least one failure event of at least one of the plurality of power stage circuits, controlling, by the at least one of the plurality of power stage circuits, the highest temperature signal to be in a preset voltage level;

when the highest temperature signal is in the preset voltage level, performing, by the at least one of the plurality of power stage circuits, a synchronization with the control circuit, wherein by the at least one of the plurality of power stage circuits, performing the synchronization with the control circuit comprises:

by the at least one of the plurality of power stage circuits and the control circuit, simultaneously delaying at least one first clock signal of the at least one of the plurality of power stage circuits and a second clock signal of the control circuit by a preset time; and outputting, by the at least one of the plurality of power stage circuits, at least one failure code signal to the control circuit through at least corresponding one of a plurality of current feedback terminals of the plurality of power stage circuits.

10. The failure reporting method of claim 9, further comprising:

outputting, by the plurality of power stage circuits, a plurality of current feedback signals to the control circuit through the plurality of current feedback terminals, wherein at least corresponding one of the plurality of current feedback signals outputted by the at least corresponding one of the plurality of current feedback terminals comprises the at least one failure code signal.

11. The failure reporting method of claim 10, further comprising:

adjusting, by the at least one of the plurality of power stage circuits, a voltage level of the at least corresponding one of the plurality of current feedback signals, to generate the at least one failure code signal.

12. The failure reporting method of claim 11, wherein adjusting the voltage level of the at least corresponding one of the plurality of current feedback signals to generate the at least one failure code signal comprises:

adjusting, by the at least one of the plurality of power stage circuits, the at least corresponding one of the plurality of current feedback signals to having a corresponding pulse count as the at least one failure code signal according to the at least one failure event.

13. The failure reporting method of claim 11, wherein adjusting the voltage level of the at least corresponding one of the plurality of current feedback signals to generate the at least one failure code signal comprises:

adjusting, by the at least one of the plurality of power stage circuits, the at least corresponding one of the plurality of current feedback signals to having a corresponding data code as the at least one failure code signal according to the at least one failure event.

14. The failure reporting method of claim 10, further comprising:

outputting, by the plurality of power stage circuits, a plurality of output currents according to a plurality of control signals outputted by the control circuit, wherein the plurality of output currents are corresponding to the plurality of current feedback signals, respectively; and generating, by the plurality of power stage circuits, a plurality of temperature feedback signals, wherein one of the plurality of temperature feedback signals with a maximum voltage level is used as the highest temperature signal.

15. The failure reporting method of claim 10, wherein during a period when the at least one of the plurality of power stage circuits performs the synchronization with the control circuit, a voltage level of the at least corresponding one of the plurality of current feedback signals is changed to another preset voltage level different from the preset voltage level.

16. The failure reporting method of claim 10, further comprising:

when the highest temperature signal is in the preset voltage level, controlling, by the control circuit, the plurality of current feedback signals to be in another preset voltage level different from the preset voltage level by disenabling a plurality of control signals;

wherein the control circuit is configured to output the plurality of control signals to the plurality of power stage circuits, respectively.

17. The failure reporting method of claim 9, further comprising:

decoding, by the control circuit, the at least one failure code signal, to obtain and store a type of the at least one failure event.

* * * * *